United States Patent
Link, II et al.

(10) Patent No.: US 6,334,054 B1
(45) Date of Patent: Dec. 25, 2001

(54) WIRELESS TELEPHONE WITH IMPROVED PAGER MODE

(75) Inventors: Charles M. Link, II, Roswell; Donald M. Cardina, Lawrenceville, both of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/421,412

(22) Filed: Oct. 21, 1999

(51) Int. Cl.[7] .......................... H04M 11/10; H04M 3/42
(52) U.S. Cl. ........................................ 455/413; 455/417
(58) Field of Search ............................ 455/413, 415, 455/417, 426, 466, 31.2, 31.3, 38.2, 566, 435, 445; 340/825.44; 379/88.15–88.19, 88.21, 210–212

(56) References Cited

U.S. PATENT DOCUMENTS

| | | | |
|---|---|---|---|
| 5,541,976 | * | 7/1996 | Ghisler .............................. 455/38.3 |
| 5,559,860 | * | 9/1996 | Mizikovsky ........................ 455/413 |
| 6,192,234 | * | 10/1998 | Chavez .............................. 455/414 |
| 5,842,141 | * | 11/1998 | Vaihoja et al. ..................... 455/574 |
| 6,175,741 | * | 12/1998 | Alperovich ......................... 455/458 |
| 6,198,916 | * | 5/1999 | Martin et al. ...................... 455/413 |
| 6,201,950 | * | 3/2001 | Fuller et al. ....................... 455/31.2 |

OTHER PUBLICATIONS

Telecommunications Industry/Electronic Industries Association Interim Standard 136.1, "TDMA Cellular/PCS—Radio Interface—Mobile Station—Base Station Compatibility—Digital Control Channel" (TIA/EIA/IS–136.1–A) (Oct. 1996), with addendum 1 (TIA/EIA/IS–136.1–A–1) (Nov. 1996) and addendum 2 (TIA/IIA/IS–136.1–A–2) (Sep. 1997).

* cited by examiner

Primary Examiner—Nguyen T. Vo
Assistant Examiner—Duc Nguyen
(74) Attorney, Agent, or Firm—Shaw Pittman LLP

(57) ABSTRACT

A wireless telephone having a user-selectable pager mode in which, in response to a page message associated with an incoming call, the wireless telephone transmits a data message which causes the incoming call to be redirected to a voice mail system without delay due to a system-determined time interval for allowing wireless telephone users to answer incoming calls.

16 Claims, 6 Drawing Sheets

WIRELESS TELEPHONE WITH IMPROVED PAGER MODE

FIELD OF THE INVENTION

The invention relates to wireless telephones.

BACKGROUND OF THE INVENTION

Conventional wireless telephones generally offer both voice and data communications capabilities and allow real-time voice communications. As described below, such real-time communications are not always desirable by a user who wishes only to receive a message without having his current activity disturbed.

Pagers, on the other hand, are miniature receivers which receive data transmissions from at least one paging terminal which covers a selected geographic area. A pager is generally tuned to a particular tone or data bit-modulated frequency that is shared with many other pagers. A particular sequence of tones or data bits is used as an address or the identification of a selected pager. Reception of the particular sequence activates an acoustic, tactile or visible alert, thereby indicating that a call has been placed to the paging terminal from a telephone connected to the public switched telephone network (PSTN) or other telecommunications network and communicated via the transmitter to the pager. Depending on the complexity of the pager, the paging device may receive a voice or data message following the alert, or the alert alone may simply indicate to the user that a call was made and a prearranged action should be taken. To respond to a page, the paged party typically must find an available conventional or wireless telephone and initiate a telephone call to the party that initiated the page.

There have been several attempts to make wireless telephones a substitute for pagers by incorporating pager features into the wireless telephone system. The objective of these attempts is to enable the wireless telephone user to receive short digital messages and to allow the user to screen incoming calls and respond to selected messages when time allows, without interrupting the user's activities.

One such attempt is called short messaging services (SMS). Using SMS, an alpha-numeric or numeric message (hereinafter collectively "alpha-numeric message") is transmitted to a wireless telephone and appears on the screen of the unit. This may be accomplished in at least three different ways: First, the caller may call the wireless telephone number and be transferred to the user's voice mailbox. The caller is then prompted to enter the caller's telephone number or other alpha-numeric message, which is transmitted to the wireless telephone by the voice mail system. Second, a caller can use either e-mail or a web page to send an alpha-numeric message to a user's wireless telephone. A third way is to use a paging system such as a voice response system (VRS), whereby the caller calls a toll-free number, is prompted by the system to enter the user's PIN number (usually the user's 10-digit telephone number or a 7-digit alias) and the caller's telephone number or other alpha-numeric message which is transmitted to the wireless telephone by the VRS. Only the first of these methods permits the caller to call the user's wireless telephone number, as opposed to calling another number or accessing e-mail or the world-wide web. Moreover, these SMS methods have the drawback that their use is not controlled by the wireless telephone user, and consequently he cannot force callers to use SMS during time periods when he does not want his activities disturbed by calls to his wireless telephone.

From the wireless telephone user's perspective, he has several options for making his wireless telephone function like a pager. Conventional wireless telephones have several operating modes, including silent or meeting mode and a pager mode. In silent mode, there is no audible or tactile ringing signal in response to incoming calls. In meeting mode, the user is alerted by different ringing signals (e.g. different tone volumes or patterns) corresponding to various Caller IDs stored by the user in the memory of the wireless telephone. In pager mode, the user is alerted to an incoming call with yet another distinguishable tone. In any of these conventional modes, unless the user answers the call, the caller must wait several rings before being transferred to voice mail, where he is prompted to leave either an alpha-numeric or recorded voice message for the user. Although the ringing signal is typically silenced in both the silent mode and pager mode, the caller still must wait a system-determined time interval (e.g., 60 seconds) before being transferred to voice mail. In addition, in some wireless telephone systems such as the Global System Mobile (GSM) system (implemented in Europe, Australia, New Zealand and parts of the Orient), a user can screen calls based on the Caller ID and send selected calls directly to voice mail by pushing a button. Even in the GSM system, however, unless the user accepts or rejects a call, the caller must wait several rings before being transferred to voice mail.

In view of the foregoing drawbacks in existing wireless telephone systems, an object of the present invention is to provide a wireless telephone which functions similar to a pager. Another object of the invention is to provide a pager mode for a wireless telephone in which incoming calls are transferred immediately to voice mail without waiting for 60 seconds or other system- or user-determined time interval for allowing wireless telephone users to accept incoming calls. A further object of the invention is to provide a high priority screening feature which allows certain preselected high priority calls to circumvent the pager mode and be answered by the wireless telephone user in the normal fashion. A still further object of the invention is to provide a screening feature which permits the user to screen the Caller IDs of all incoming calls before they are transferred to voice mail, while the wireless telephone is in pager mode.

SUMMARY OF THE INVENTION

In a first aspect, the invention provides a wireless telephone having a user-selectable pager mode in which, in response to a page message associated with an incoming call, the wireless telephone transmits a data message which causes the incoming call to be redirected to a voice mail system without delay due to a system-determined time interval for allowing wireless telephone users to answer incoming calls.

In a second aspect, the invention provides a wireless telephone having a user-selectable pager mode in which, in response to a page message associated with an incoming call, the wireless telephone transmits a power down registration, immediately followed by a power up registration, to a wireless telephone switching office from which the page message originated. This power down registration causes the incoming call to be redirected to a voice mail system without delay due to a system-determined time interval for answering incoming calls.

In a third aspect, the invention provides a wireless telephone having a user-selectable pager mode in which the wireless telephone distinguishes between high priority calls and non-high priority calls, the former having been designated in the memory of the wireless telephone. In response to a page message associated with a non-high priority call, the wireless telephone transmits a power down registration, immediately followed by a power up registration, and the call is immediately transferred to voice mail.

In a fourth aspect, the invention provides a method for redirecting incoming calls to a wireless telephone to a voice mail system. When a page message is received from a wireless telephone switching office, the wireless telephone emits a signal to alert the wireless telephone user to an incoming call, and the caller ID is displayed on a screen of the wireless telephone. If a predetermined time interval elapses without the user accepting the call, the wireless telephone transmits a power down registration, immediately followed by a power up registration, to the wireless telephone switching office, and the call is transferred to voice mail.

In a fifth aspect, the invention provides a method for selectively redirecting incoming calls to a voice mail system. When a page message is received from a wireless telephone switching office, the wireless telephone compares the caller ID with information stored in its memory to determine whether the call is a high priority call or a non-high priority call. If the call is not a high priority call, the wireless telephone emits an alert signal and displays the caller ID. If a predetermined time interval elapses without the user answering the call, the wireless telephone transmits a power down registration, immediately followed by a power up registration, and the call is transferred to voice mail.

A significant advantage of the present invention is that it can be implemented by altering the functionality of wireless telephone without the need for changes to the network.

DETAILED DESCRIPTION OF THE INVENTION

Figure 1:
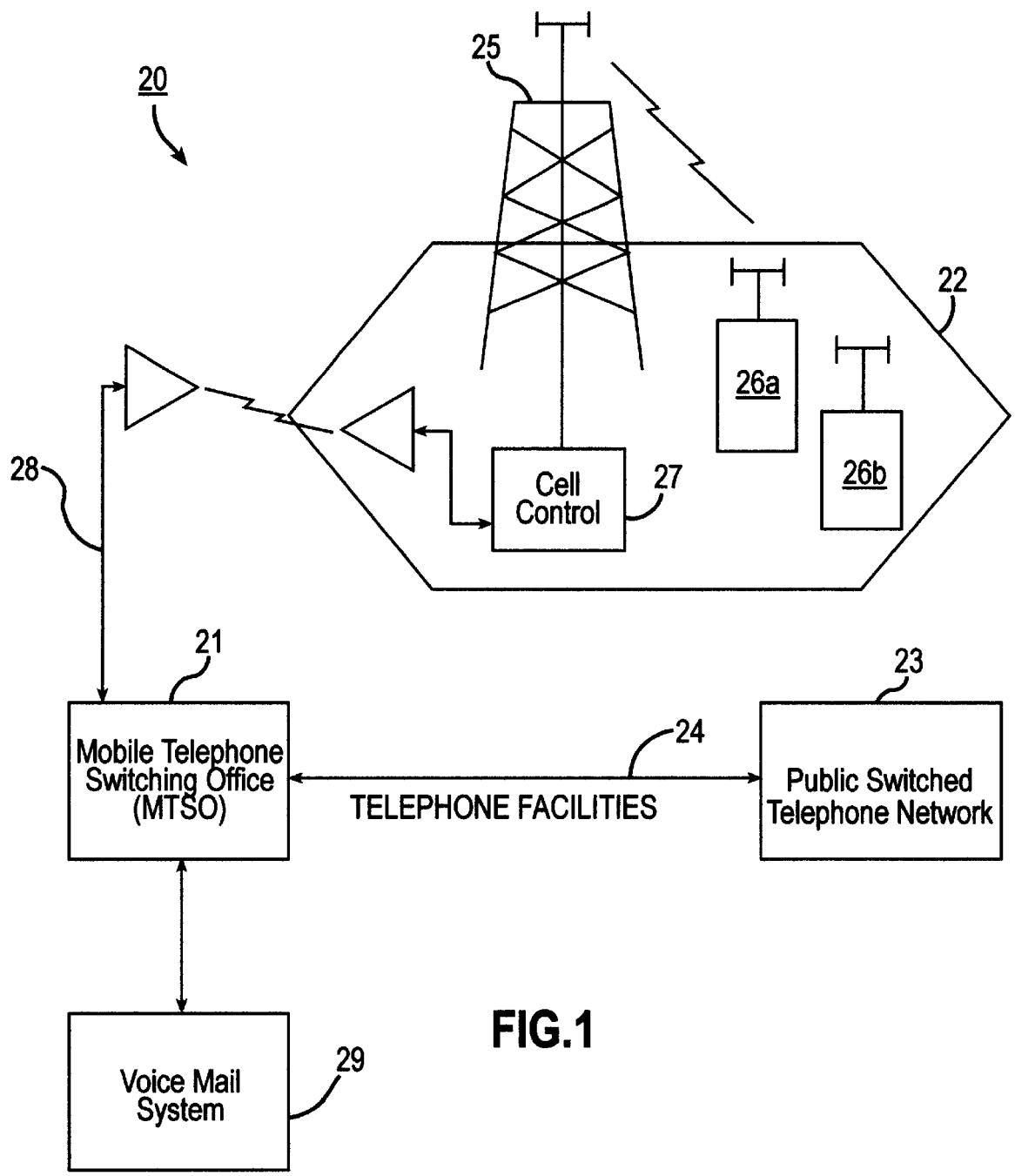
FIG. 1 is a block diagram of a wireless telephone system in which the invention may be implemented.

As shown in FIG. 1, a conventional wireless telephone system 20 comprises at least one wireless (or mobile) telephone switching office (MTSO) 21 (also known as a mobile switching center (MSC)), coupled to an appropriate array of cell sites 22. MTSO 21 normally couples telephone conversations involving wireless telephones 26 operating in cell 22 to the public switched telephone network (PSTN) 23 or other telecommunications network through telephone facilities 24. Each cell 22 covers a specific geographic area and is served by a broadcast antenna 25 to permit communications between wireless telephones 26a and 26b operating within cell 22 and a cell control 27. MTSO 21 communicates with cell 22 either by dedicated telephone facilities (not shown) or, more frequently, by a cell-to wireless telephone switching office data link 28. MTSO 21 is also connected with a voice mail system 29 associated with the wireless telephone system.

MTSO 21 communicates with wireless telephones 26a and 26b operating within cell 22 via a network control channel, which is responsible for receiving and transmitting data to control the communication actions of the wireless telephones. In a conventional wireless telephone system, the network control channel comprises two radio channels that are commonly described as a forward control channel (FOCC) and a reverse control channel (RECC). The FOCC is used for communications initiated by MTSO 21 to a radiotelephone unit, such as wireless telephone 26a, while the RECC is used for communications from the radiotelephone to the MTSO 21. The control channel is dedicated to receiving and transmitting data messages to and from wireless telephones, including requests for service from wireless telephones, paging messages to selected wireless telephones, and instructions to selected wireless telephones to tune to a particular voice channel where a conversation may take place.

The data message and radio channel specifications for U.S. wireless telephone systems are set forth in Telecommunications Industry Association/Electronic Industries Association Interim Standard 136.1, "800 MHz TDMA Cellular—Radio Interface—Mobile Station—Base Station Compatibility-Digital Control Channel," dated December 1994 (hereinafter "TIA/EIA/IS-136.1"), which is hereby incorporated by reference herein in its entirety. TIA/EIA/IS-136.1 is published by the Standards and Technology Department of the Telecommunications Industry Association, 2001 Pennsylvania Avenue, N.W., Washington, D.C. 20006. Copies may be obtained by calling Global Engineering Documents (1-800-854-7179).

It is well known that when a wireless telephone first powers up or first enters a cell of a wireless telephone system when already powered, the unit identifies itself as actively present within the system. The radiotelephone identifies itself or "registers" through a process known as Autonomous Registration by supplying a data packet first to the cell 22 and then through data link 28 to the MTSO 21. This data packet contains the wireless unit's telephone number, known as the Mobile Identification Number (MIN) and the wireless unit's Station Class Mark (SCM), which identifies functional characteristics of the unit. Wireless telephone system operators typically also require the transmission of additional data such as the MIN2, which is the high order three digits or NPA of the unit's telephone number, and the Electronic Serial Number (ESN). This Autonomous Registration data packet is similar to a Call Origination data packet, i.e., the data sent to the MTSO when a wireless telephone originates a call. The Call Origination data message is defined in TIA/EIS/IS-136.1. The original design intent of Autonomous Registration was to improve the efficiency of potential future call deliveries by keeping the MTSO informed of the approximate whereabouts of each individual wireless telephone unit, and to reduce paging channel load by lessening the need to page all cells to find a particular wireless telephone. When the MTSO is thus informed, it can "page" (i.e., attempt to ring) the wireless telephone only in the cell or area in which it was last known to be. Additional cells are paged only if the wireless telephone is not found with the initial page.

The use of the Autonomous Registration to identify "roamers" or wireless telephone units being used outside their home service areas and the transmission of message packets to and from such "roamer" telephones and their home MTSO is well known in the art and beyond the scope of this disclosure.

In addition to the Autonomous Registration, a conventional wireless telephone also sends a data message to the MTSO when the unit is turned off or powered down. This data message, known as a Power Down Registration, contains data similar to the Autonomous Registration, including the MIN, the ESN, and a power down flag. Upon receipt of a Power Down Registration, the MTSO is informed that the wireless telephone that sent the message is no longer active within the system, and the MTSO will not attempt to page the wireless telephone in response to incoming calls directed to it. Instead, incoming calls for the inactive wireless telephone are sent to a voice mail system associated with the wireless telephone system.

The pager mode of the invention will now be described in detail with reference to the flow charts of FIGS. 2–6. In step 1, a call is placed to a wireless telephone served by a wireless telephone system. In response to the incoming call, the MTSO prepares a data message known as a Page Message, which contains an address that uniquely identifies the wireless telephone to which the incoming call is directed. The Page Message also contains paging data, such as the Caller ID of the incoming call, which is intended for communication to the wireless telephone user. In step 2, the MTSO transmits the Page Message to the called wireless telephone via a network forward control channel (FOCC).

In step 3, the called wireless telephone responds to a Page Message containing its particular address by preparing and transmitting an Acknowledgement Message to the MTSO, also via a network reverse control channel (RECC). The Acknowledgement Message contains data fields, including a service mode field, which allow the wireless telephone to communicate information to the MTSO regarding the status and capabilities of the wireless telephone.

In accordance with the present invention, a wireless telephone has a number of operational modes that can be selected by the user, among which is a pager mode. In response to a page message, in step 4, the wireless telephone checks to see whether the user has selected pager mode. If the wireless telephone is not in pager mode, the wireless telephone rings (step 5), the user has the opportunity to accept the call (step 6), and the call is either completed (step 7) or transferred to a voice mail system (step 11).

Figure 2:
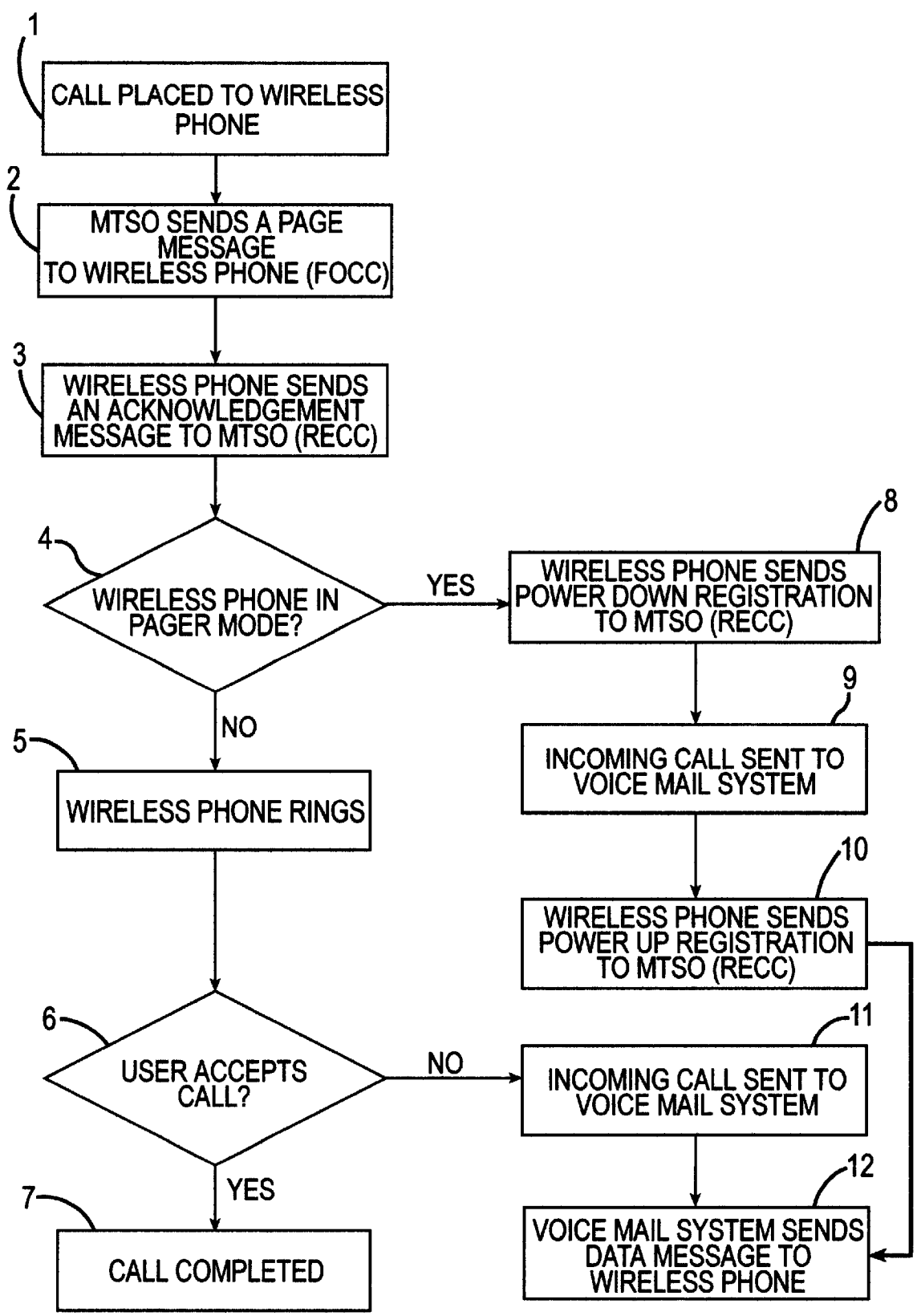
FIG. 2 is a flow chart illustrating the operation of a first embodiment of the pager mode of the invention.

FIG. 2 illustrates a first embodiment of the pager mode of the invention. In this embodiment, if a Page Message is received while the wireless telephone is in pager mode, then in step 8, the wireless telephone transmits a Power Down Registration to the MTSO. Alternatively, step 4 can be omitted. Instead of checking to determine whether pager mode has been selected each time a Page Message is received, the wireless telephone automatically responds to a Page Message by sending a Power Down Registration (step 8) when the wireless telephone is in pager mode. Despite transmission of a Power Down Registration, the wireless telephone remains powered up. Sending the Power Down Registration is simply a means for instructing the MTSO and the wireless telephone system that the wireless telephone is not available for voice communications and that an incoming call should be redirected to a voice mail system.

In step 9, in response to the Power Down Registration, the MTSO forwards the incoming call that initiated the Page Message to a voice mail system. The voice mail system may prompt the caller to leave either a voice message or an alpha-numeric message for the wireless telephone user.

In step 10, the wireless telephone prepares and transmits a Power Up Registration to the MTSO. This Power Up Registration is the same as the Autonomous Registration described above. The Power Up Registration is transmitted immediately after the Power Down Registration in order to permit the wireless telephone to receive subsequent data messages, e.g., from a voice mail system in response to a voice message or alpha-numeric message left by the caller.

After a voice mail message has been left, in step 12, the voice mail system transmits a data message to the wireless telephone via the network control channel. This data message may simply be an indicator that a voice message has been recorded and/or may also contain an alpha-numeric message that has been prepared by the caller or an alpha-numeric message, such as the Caller ID, that has been prepared and transmitted by the voice mail system. This indicator and/or alpha-numeric message are displayed on the screen of the wireless telephone.

Steps 1 to 12 function in essentially the same manner as described above in the second, third and fourth embodiments of the invention which are described below.

Figure 3:
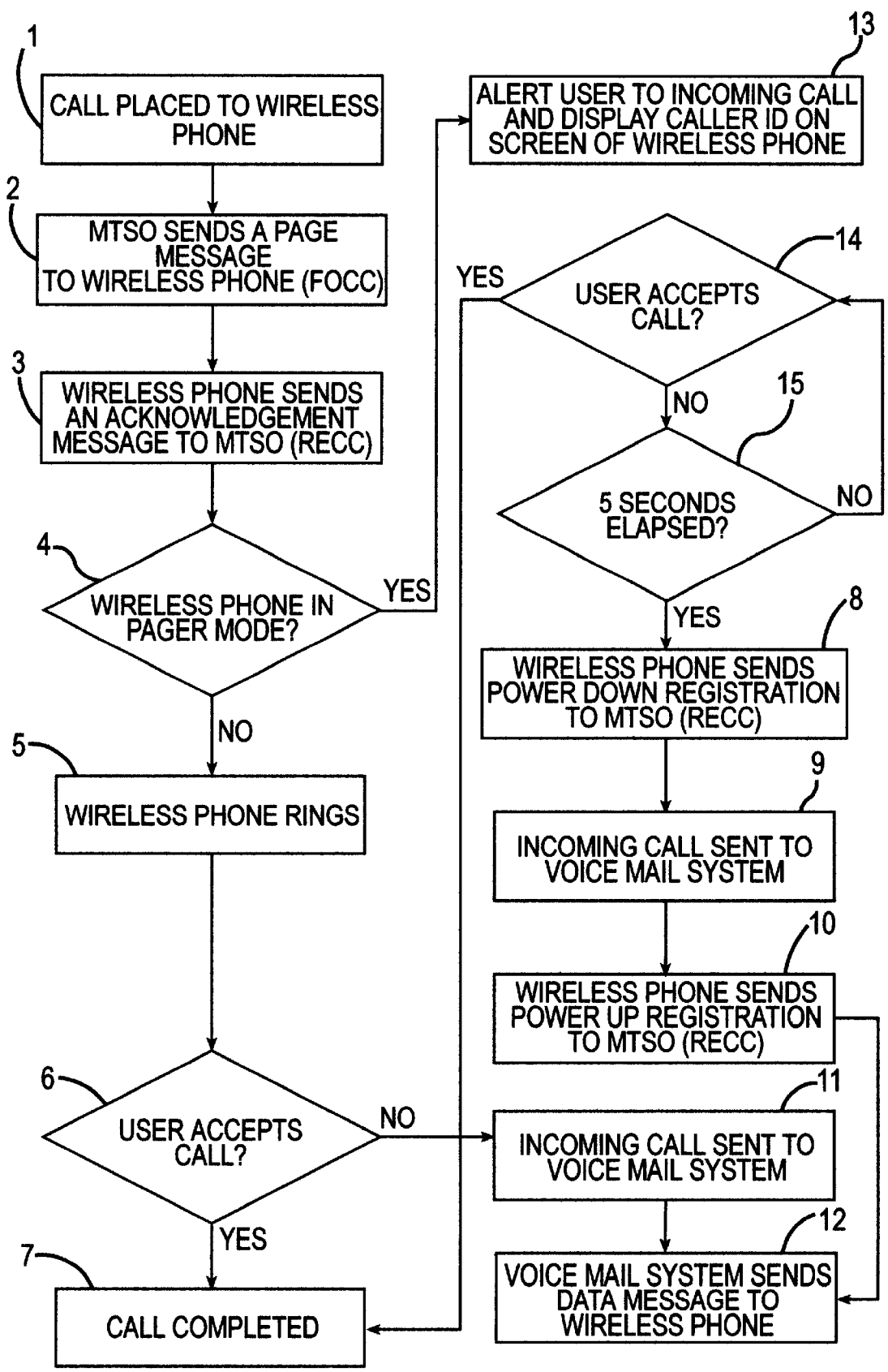
FIG. 3 is a flow chart illustrating the operation of a second embodiment of the pager mode of the invention, which includes a user call screening function.

FIG. 3 illustrates a second embodiment of the pager mode of the invention, which includes a user call screening function. In this embodiment, the wireless telephone user can review the Caller ID of an incoming call and answer the call, if desired. When pager mode has been selected and a Page Message is received, in step 13, the wireless telephone alerts the user to an incoming call, e.g., with a short beep, and displays the Caller ID of the incoming call. In steps 14 and 15, the wireless telephone pauses five seconds (or other user-selected time interval that has been stored in the memory of the wireless telephone) to enable the user to answer the call. If the user accepts the call by pushing the Send or Talk button (step 14), then the call is completed in the conventional manner (step 7). If the user does not accept the call, then the wireless telephone transmits a Power Down Registration, and the call is transferred to a voice mail system, as described above (steps 8 and 9).

Figure 4:
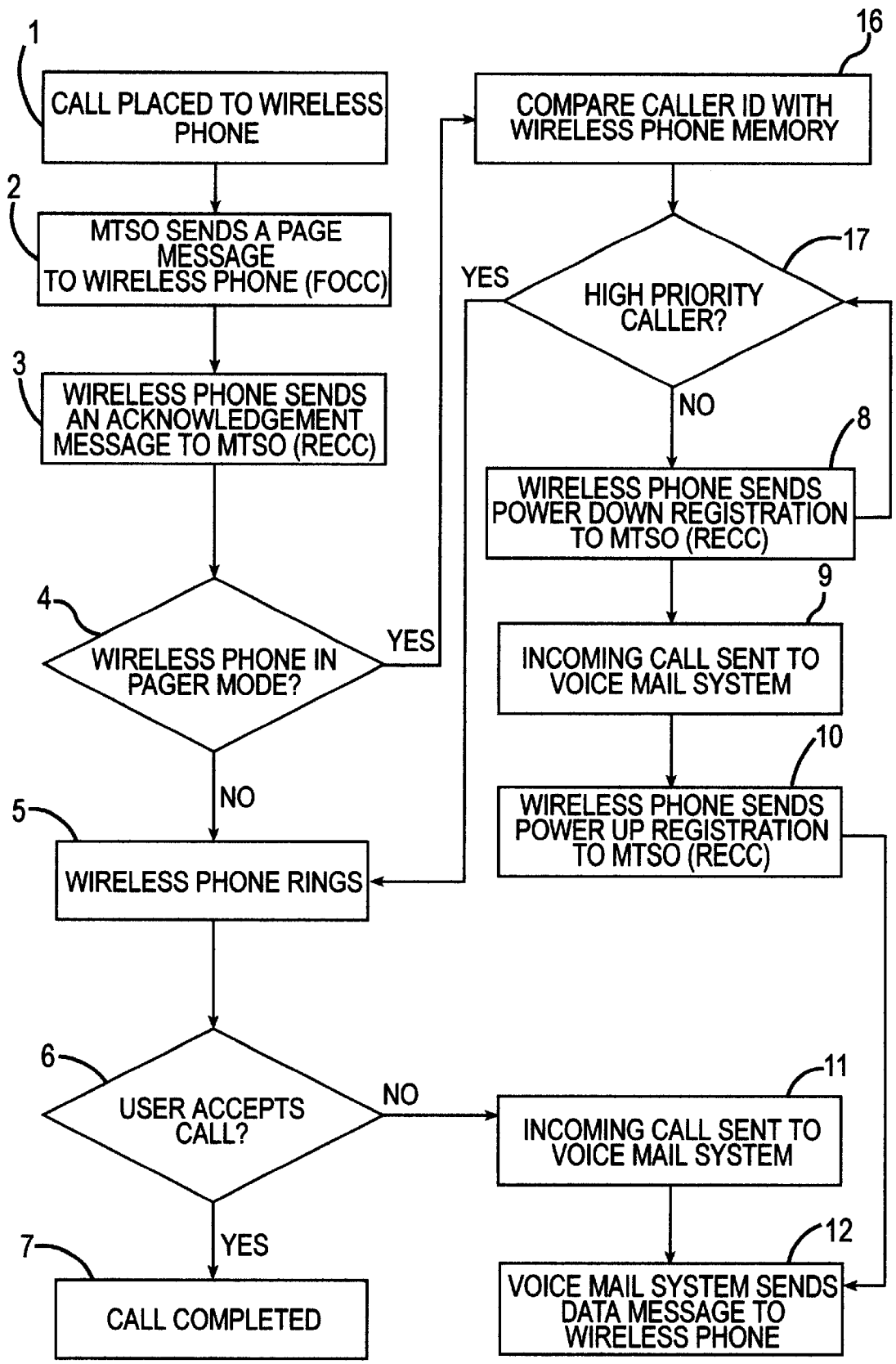
FIG. 4 is a flow chart illustrating the operation of a third embodiment of the pager mode of the invention, which includes a high priority call screening function.

In a third embodiment of the invention as illustrated in FIG. 4, the user has the option of storing in the memory of the wireless telephone the Caller IDs corresponding to certain "high priority" callers. This can be done, for example, by allowing the user to select a "high priority flag" when storing telephone numbers in the address book or memory such as a repertory memory of the wireless telephone. In this embodiment, when pager mode has been selected and a Page Message is received, in step 16, the wireless telephone compares the Caller ID contained in the Page Message with the memory of the radiotelephone. If the Caller ID has been identified as a "high priority" caller (step 17), then no Power Down Registration is sent, the wireless telephone rings (step 5), and the call can be completed in the conventional manner (steps 6 and 7). If the Caller ID has not been identified in the memory of the wireless telephone as a "high priority" caller (step 17), then the wireless telephone transmits a Power Down Registration, and the call is transferred to a voice mail system as described above (steps 8 and 9).

Figure 5:
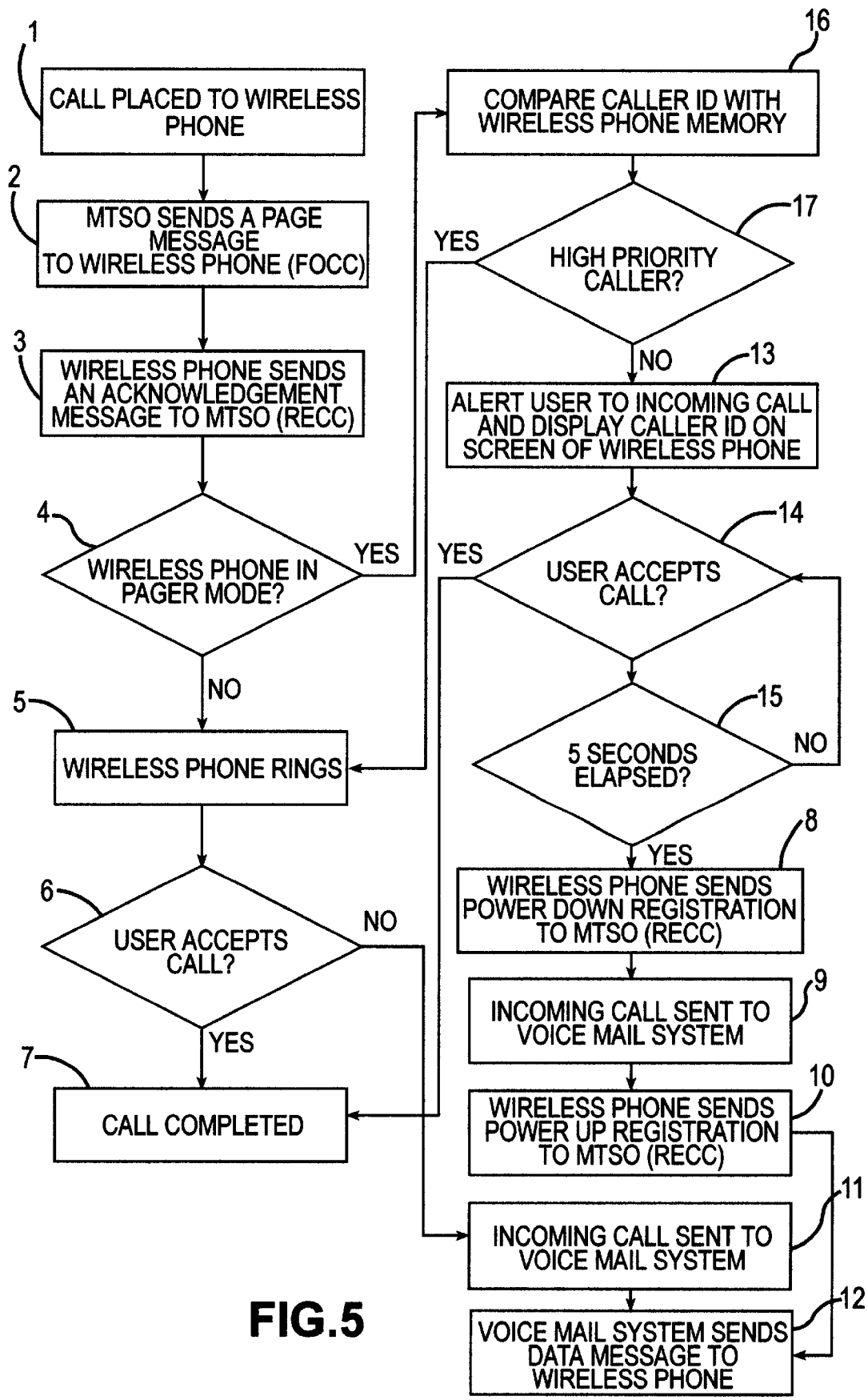
FIG. 5 is a flow chart illustrating the operation of a fourth embodiment of the pager mode of the invention, which includes both a user call screening function and a high priority call screening function.

FIG. 5 illustrates a fourth embodiment of the invention, which combines the user call screening function illustrated in FIG. 3 with the high priority call screening function illustrated in FIG. 4. In this embodiment, when pager mode has been selected and a Page Message is received, in step 16, the wireless telephone compares the Caller ID contained in the Page Message with the memory of the radiotelephone. If the Caller ID has been identified as a "high priority" caller (step 17), then the wireless telephone rings (step 5), and the call can be completed in the conventional manner (steps 6 and 7). If the Caller ID has not been identified in the memory of the wireless telephone as a "high priority" caller (step 17), then in step 13, the wireless telephone alerts the user to an incoming call, e.g., with a short beep, and displays the Caller ID of the incoming call. In steps 14 and 15, the wireless telephone pauses five seconds (or other user-selected time interval that has been stored in the memory of the wireless telephone) to enable the user to answer the call. If the user accepts the call by pushing the Send or Talk button (step 14), then the call is completed in the conventional manner (step 7). If the user does not accept the call, then the wireless telephone transmits a Power Down Registration, and the call is transferred to a voice mail system, as described above (steps 8 and 9).

Figure 6:
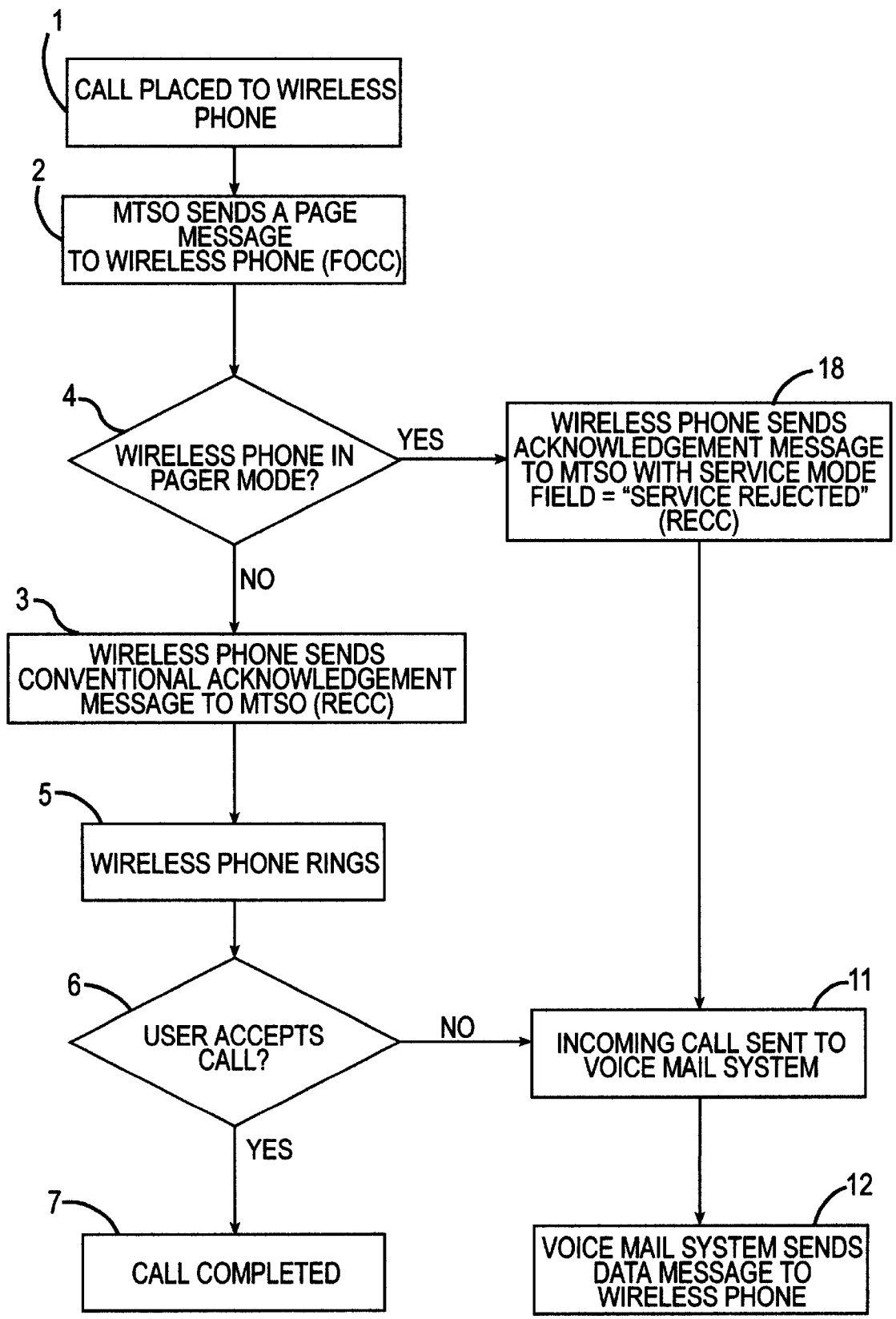
FIG. 6 is a flow chart illustrating an alternative method for implementing the pager mode of the invention.

FIG. 6 illustrates an alternative method of implementing the invention. In this embodiment, steps 1 to 7 function in essentially the same manner as described above. In this embodiment, however, when the wireless telephone is in pager mode and a Page Message is received, in step 18, the wireless telephone prepares and transmits an Acknowledgement Message that contains a "service rejected" instruction in the service mode data field. In response to this "service rejected" instruction, the MTSO forwards the incoming call that initiated the Page Message to a voice mail system (step 11), and the voice mail system sends an appropriate data message to the wireless telephone (step 12).

We claim:

1. A wireless telephone designed for operation in a wireless telephone system having a system-determined time interval for allowing wireless telephone users to answer incoming calls, said wireless telephone having an operational mode selectable by a user wherein, in response to a page message associated with an incoming call directed to said wireless telephone, said wireless telephone transmits a data message to cause said incoming call to be redirected to a voice mail system without delay due to said system-determined time interval, wherein said data message is a power down registration.

2. The wireless telephone according to claim 1, wherein, immediately following transmission of said power down registration, said wireless telephone transmits a power up registration.

3. The wireless telephone according to claim 1, wherein said data message is an acknowledgement message containing a service rejected instruction.

4. A wireless telephone designed for operation in a wireless telephone system having a system-determined time interval for allowing wireless telephone users to answer incoming calls, said wireless telephone having an operational mode selectable by a user wherein, in response a page message associated with an incoming call directed to said wireless telephone, said wireless telephone transmits a power down registration to cause said incoming call to be redirected to a voice mail system without delay due to said system-determined time interval, immediately followed by a power up registration, to a switching office from which said page message originated.

5. The wireless telephone according to claim 4, wherein, in response to said page message, said wireless telephone: (a) emits a signal to alert a user to said incoming call; (b) displays caller identification information associated with said page message on a screen of said wireless telephone; and (c) pauses for a predetermined time interval to allow the user to answer said incoming call before transmitting said power down registration.

6. A wireless telephone designed for operation in a wireless telephone system having a system-determined time interval for allowing wireless telephone users to answer incoming calls, said wireless telephone having an operational mode selectable by a user wherein: (a) said wireless telephone distinguishes between a first type of incoming call that has been designated as a high priority call in a memory of said wireless telephone and a second type of incoming call that has not been so designated; and (b) in response to a page message associated with said second type of incoming call to said wireless telephone, said wireless telephone transmits a power down registration to cause said second type of incoming call to be redirected to a voice mail system without delay due to said system-determined time interval.

7. The wireless telephone according to claim 6, wherein said wireless telephone compares caller identification information contained in a page message associated with an incoming call with information stored in the memory of said wireless telephone to determine whether said incoming call has been designated as a high priority call.

8. The wireless telephone according to claim 6, wherein, in response to said page message associated with said second type of incoming call, said wireless telephone: (a) emits a signal to alert a user to said incoming call; (b) displays caller identification information associated with said page message on a screen of said wireless telephone; and (c) pauses for a predetermined time interval to allow the user to answer said incoming call before transmitting said power down registration.

9. In a wireless telephone, a method for redirecting incoming calls to a voice mail system, the method comprising the steps of:
   (a) receiving a page message from a wireless telephone switching office;
   (b) emitting a signal to alert a user of said wireless telephone to an incoming call;
   (c) displaying caller identification information associated with said page message on a screen of said wireless telephone;
   (d) pausing for a predetermined time interval to allow the user to answer said incoming call;
   (e) if said incoming call is not answered, transmitting a power down registration, immediately followed by a power up registration, to said wireless telephone switching office, whereby said incoming call is redirected to a voice mail system.

10. The method according to claim 9, wherein said wireless telephone is designed for operation in a wireless telephone system having a system-determined time interval for allowing wireless telephone users to answer incoming calls, and said incoming call is redirected to a voice mail system without delay due to said system-determined time interval.

11. The method according to claim 9, further comprising the steps of: receiving a data message from said voice mail system, and (g) displaying information contained in said data message on a screen of said wireless telephone.

12. The method according to claim 11, wherein said data message comprises at least one of: (a) an alpha-numeric message prepared by a caller who initiated said incoming call, and (b) a data message prepared by said voice mail system in response to a voice message recorded by said caller.

13. In a wireless telephone, a method for selectively redirecting incoming calls to a voice mail system, the method comprising the steps of:

(a) receiving a page message from a wireless telephone switching office, said page message including caller identification information;

(b) comparing said caller identification information with information stored in a memory of said wireless telephone to determine whether said incoming call has been designated as a high priority call;

(c) if said incoming call has not been preselected as a high priority call, (i) emitting a signal to alert a user of said wireless telephone to said incoming call, (ii) displaying said caller identification information on a screen of said wireless telephone, (iii) pausing for a predetermined time interval to allow the user to answer said incoming call, and (iv) if said incoming call is not answered, transmitting a power down registration, immediately followed by a power up registration, to said wireless telephone switching office, whereby said incoming call is redirected to a voice mail system.

14. The method according to claim 13, wherein said wireless telephone is designed for operation in a wireless telephone system having a system-determined time interval for allowing wireless telephone users to answer incoming calls, and said incoming call is redirected to a voice mail system without delay due to said system-determined time interval.

15. The method according to claim 13, further comprising the steps of: (v) receiving a data message from said voice mail system, and (vi) displaying information contained in said data message on a screen of said wireless telephone.

16. The method according to claim 15, wherein said data message comprises at least one of: (a) an alpha-numeric message prepared by a caller who initiated said incoming call, and (b) a data message prepared by said voice mail system in response to a voice message recorded by said caller.

* * * * *